US008286405B1

(12) United States Patent  (10) Patent No.: US 8,286,405 B1
Bolton et al.  (45) Date of Patent: Oct. 16, 2012

(54) FIRE AND IMPACT RESISTANT WINDOW AND BUILDING STRUCTURES

(75) Inventors: Nelson Bolton, Trumbauersville, PA (US); W. Novis Smith, Philadelphia, PA (US); Elizabeth Wimmer, Palm, PA (US)

(73) Assignee: AGP Plastics, Inc., Trumbauersville, PA (US)

( * ) Notice: Subject to any disclaimer, the term of this patent is extended or adjusted under 35 U.S.C. 154(b) by 0 days.

(21) Appl. No.: 12/931,843

(22) Filed: Feb. 11, 2011

Related U.S. Application Data

(63) Continuation-in-part of application No. 12/928,535, filed on Dec. 14, 2010, and a continuation-in-part of application No. 12/462,884, filed on Aug. 11, 2009.

(51) Int. Cl.
*E04C 2/54* (2006.01)

(52) U.S. Cl. .......... 52/786.11; 52/204.5; 52/656.3; 428/921; 442/136

(58) Field of Classification Search .......... 52/786.1, 52/786.11, 786.12, 788.1, 656.3, 204.5, 204.591, 52/204.593; 428/920, 921; 442/136, 140, 442/141
See application file for complete search history.

(56) References Cited

U.S. PATENT DOCUMENTS

| | | | | |
|---|---|---|---|---|
| 2,659,686 A * | 11/1953 | Watkins | .......... | 52/208 |
| 3,044,998 A * | 7/1962 | Emrick et al. | .......... | 526/239 |
| 3,520,768 A * | 7/1970 | Dietzel et al. | .......... | 428/174 |
| 3,666,614 A * | 5/1972 | Snedeker et al. | .......... | 428/412 |
| 4,125,669 A * | 11/1978 | Triebel et al. | .......... | 428/412 |
| 4,168,175 A * | 9/1979 | Shutt | .......... | 106/15.05 |
| 4,190,698 A * | 2/1980 | De Boel et al. | .......... | 428/334 |
| 4,312,903 A * | 1/1982 | Molari, Jr. | .......... | 428/34 |
| 4,325,863 A * | 4/1982 | Hinsken et al. | .......... | 524/111 |
| 4,338,244 A * | 7/1982 | Hinsken et al. | .......... | 524/109 |
| 4,663,228 A * | 5/1987 | Bolton et al. | .......... | 428/334 |
| 5,002,820 A * | 3/1991 | Bolton et al. | .......... | 428/215 |
| 5,175,312 A * | 12/1992 | Dubs et al. | .......... | 549/307 |
| 5,190,826 A * | 3/1993 | Asahina et al. | .......... | 428/437 |
| 5,216,052 A * | 6/1993 | Nesvadba et al. | .......... | 524/108 |
| 5,219,630 A * | 6/1993 | Hickman | .......... | 428/38 |
| 5,252,643 A * | 10/1993 | Nesvadba | .......... | 524/111 |
| 5,356,966 A * | 10/1994 | Nesvadba | .......... | 524/111 |
| 5,367,008 A * | 11/1994 | Nesvadba | .......... | 524/111 |
| 5,369,159 A * | 11/1994 | Nesvadba | .......... | 524/111 |
| 5,428,162 A * | 6/1995 | Nesvadba | .......... | 544/221 |
| 5,428,177 A * | 6/1995 | Nesvadba | .......... | 549/304 |
| 5,488,117 A * | 1/1996 | Nesvadba | .......... | 549/302 |
| 5,516,920 A * | 5/1996 | Nesvadba et al. | .......... | 549/307 |
| 5,607,624 A * | 3/1997 | Nesvadba et al. | .......... | 252/589 |
| 5,614,572 A * | 3/1997 | Nesvadba et al. | .......... | 524/111 |
| 5,693,829 A * | 12/1997 | Nesvadba et al. | .......... | 549/307 |
| 5,773,631 A * | 6/1998 | Nesvadba et al. | .......... | 549/43 |
| 5,814,692 A * | 9/1998 | Nesvadba | .......... | 524/107 |
| 6,140,397 A * | 10/2000 | Meier et al. | .......... | 524/111 |
| 6,521,681 B1 * | 2/2003 | Zingg et al. | .......... | 524/99 |
| 6,586,606 B2 * | 7/2003 | Gerster et al. | .......... | 549/302 |
| 6,675,550 B1 * | 1/2004 | Dlubak | .......... | 52/786.11 |
| 2007/0234653 A1 * | 10/2007 | Ringness | .......... | 52/182 |

* cited by examiner

*Primary Examiner* — William Gilbert

(74) *Attorney, Agent, or Firm* — John Lezdey

(57) ABSTRACT

The invention relates to fire and impact resistant windows and building structures which contain a window composed of a specific order of layers containing a novel fire resistant layer. The invention further pertains to coating compositions for use with structures containing the windows.

12 Claims, 1 Drawing Sheet

FIRE AND IMPACT RESISTANT WINDOW AND BUILDING STRUCTURES

RELATED APPLICATIONS

This application is a continuation-in-part of application Ser. No. 12/928,535 of Bolton et al filed Dec. 14, 2010 and entitled "Impact and Fire Resistant Windows", and application Ser. No. 12/462,884 filed Aug. 11, 2009.

FIELD OF THE INVENTION

The present invention relates to fire and impact resistant windows and building structures which contain borate and phosphate anions in a coating composition or as a layer in a glazing unit.

BACKGROUND OF THE INVENTION

Laminated glass is being used for both windows and for architectural glass. Recent acts of terrorism in the form of bomb attacks on buildings have led to renewed efforts to design transparent facades that mitigate injuries and structural damages from blast loadings and fires. Transparent facades are desirable in security areas wherein a large vision area is required.

It is further desirable to have walls and doors which are either substantially transparent or partially transparent to be resistant to fire which may occur separately or from an explosion.

Previous efforts to provide security laminates have been either to provide wire glass, i.e. wire embedded in a glass laminate which provides resistance to shock shattering and to hold the glass sheets together longer when exposed to fire and heat. However, it does not hold splinters or slivers of glass brought about by impacting and fracturing wire glass. Moreover, vision is impaired by the use of the wire glass.

An advancement in the wire glass laminates as disclosed in U.S. Pat. Nos. 2,659,686 and 5,219,630 is to provide an interlayer of plastic to hold the glass in place when broken or splintered.

Other methods to mitigate damages from blasts is to form laminates of glass and/or plastic by the use of mass and an interlayer or interlayers by use of a suitable interlayer such as polyvinyl butyral or an ionomer. However, such structures still lack the resistance necessary for incendiary blasts or fires.

U.S. Pat. No. 5,002,820 to Bolton et al, which is herein incorporated by reference discloses laminated safety glass having thick glass and intermediate film layers which prevent spall of larger pieces on impact.

The use of so-called safety glazing or penetration resistant glazing for windows, windshields, and the like using multiple layers of polycarbonate, glass and other resinous materials is well known. For example, glass-polycarbonate resin laminates are described in U.S. Pat. Nos. 4,663,228 and 3,666,614.

In U.S. Pat. No. 3,520,768 there are described laminates of relatively thick glass having a comparatively thin polycarbonate film as the adhesive layer. While generally useful, these laminates suffer from an inability to withstand multiple shots, especially when struck by high velocity bullets such as those fired from rifles.

U.S. Pat. No. 4,125,669 to Triebel et al discloses a laminated safety glass which utilizes a thick outside layer of silicate glass which is bonded to a polycarbonate pane of at least 1.5 mm thick.

U.S. Pat. No. 4,312,903 to Molari discloses impact resistant, double glazed structures comprising a plurality of laminae selected from polycarbonate, glass and solid resinous materials. The glass laminae faces the direction of impact and has a thickness from about 30 to 220 mils. The structure utilizes relatively thick outward layers and relatively thin inward layers.

It is understood that the term "plastic" applies to both "polymeric film" and "polymeric sheet" and the term "layer" applies a single film or sheet or a laminate of two or more films or sheets.

It is desirable to provide doors which are either substantially or partially comprised of transparent laminates with fire resistance.

It is also desirable to provide fire resistance to walls which are entirely comprised of glazing material or partially.

SUMMARY OF THE INVENTION

The present invention relates to impact and fire resistant windows, buildings and architectural structures which comprise laminated glass that are intended to extend glazing design to large vision areas.

According to one embodiment of the invention there is provided a window or glazing structure comprising;
A) a first glass or plastic layer;
B) a fire resistant layer of a composition comprising borate-phosphate anions, and
C) a second plastic or glass layer.

According to another embodiment of the invention there is provided a fire resistant building structure such as a façade, door or wall which contains the window or glazing structure of the invention and comprises a coating of the fire resistant composition of the invention.

It is therefore an object of the invention to provide an impact and fire resistant window.

It is another object of the invention to provide an impact and fire resistant building structure.

It is a further object of the invention to provide an impact and fire resistant building structure in combination with the windows of the present invention which are held by the structures.

The objects and advantages of the invention will be better understood from a reading of the Preferred Embodiments of the Invention and the drawings.

DESCRIPTION OF THE PREFERRED EMBODIMENTS

The present invention relates to impact and fire resistant glazing material for use as windows and in combination with building structures. The glazing material is particularly useful for forming a transparent facade.

The fire resistance can be extended by coating the structures, i.e. walls, doors, etc. in which the windows are placed with a coating composition of the invention.

Figure 1:
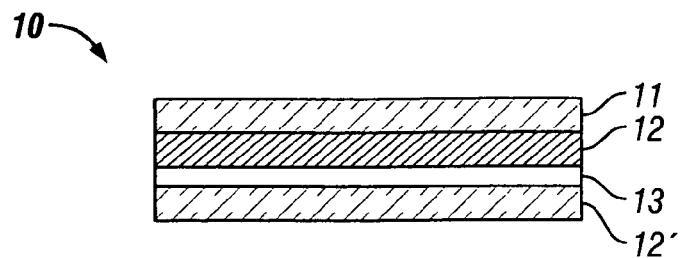
FIG. 1 is a top view of an impact and fire resistant window of the invention.

As shown in FIG. 1, there is illustrated the top view of a window pane of the invention wherein the outer layer comprises a glass pane (11), a plastic layer (12) adjacent the glass (11), a transparent fire resistant layer of the invention (13) and a plastic or glass layer (12') adjacent the fire resistant layer (13).

The interlayer (12) can be molecularly engineered to adhere well to various metals as well as glass. This allows integration of metal components in the laminate either during autoclaving or in post autoclaving attachment process.

The window pane may be symmetrical or asymmetrical.

Figure 2:
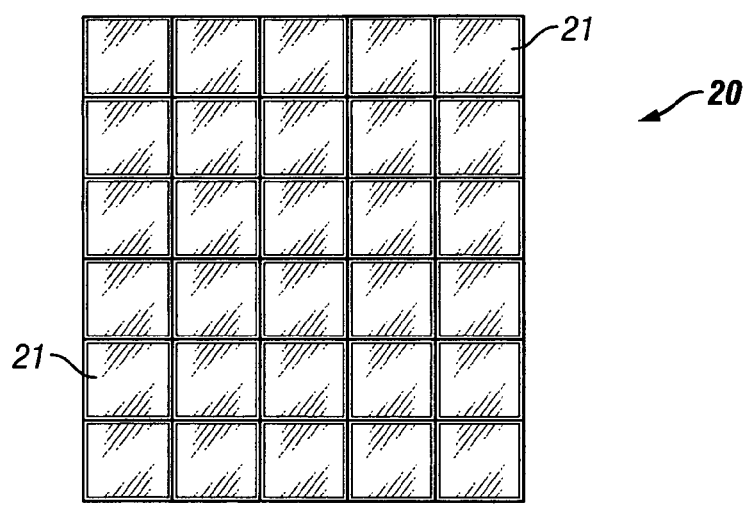
FIG. 2 is a front view of a building façade with multiple panels of the glass structures of the invention.

As shown in FIG. 2, there is an architectural structure (20) which can be used as an architectural façade. The structure (20) comprises a series of glazing material (21) similar to the window (10) of FIG. 1. In which case, one outer face can comprise glass (11) while the opposite side can comprise a plastic, preferably an ionomer, or polyvinyl butyral. Having a series of glazing structures could mitigate a collapse of the entire structure in the event of a blast. However, the structure can be composed of a single glazing depending upon its use. The use of a fire resistant layer also provides insulation.

Figure 3:
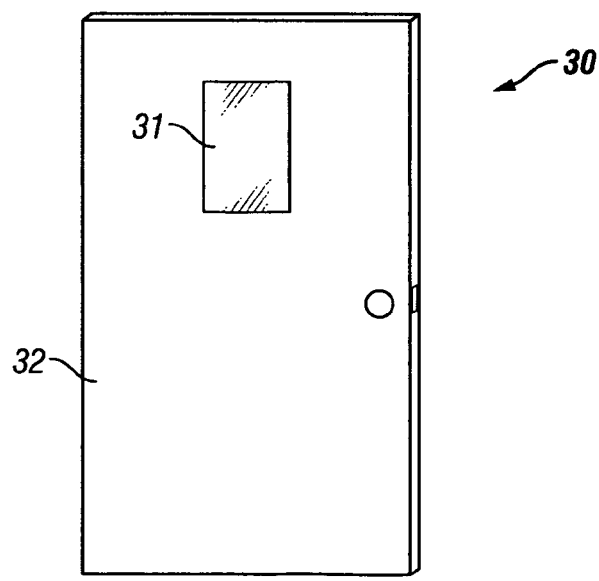
FIG. 3 is a front view of a door that is rendered fire resistant and contains a window of the invention set therein.

FIG. 3 shows a door structure (30) which houses a window of the invention (31) and the frame (42) of the door (30) contains the fire resistant coating of the invention. The frame can be coated with the coating of the invention and the window can contain metal attachments which are well known in the art.

Peripheral sealing of the sheets of glazing material in a liquid tight manner may be provided by double sided adhesive tape or strip which is either solid (i.e. gas impervious) or gas permeable. Alternatively solid mastic, butyl tapes, silicone or extrusions may be employed for peripheral sealing, although care has to be taken to avoid chemical reactions with the innerlayer material. Indeed any suitable material can be used which will seal the periphery satisfactorily and will remain unaffected by, or will not affect, e.g. optically, the chemical interlayer.

The strip material for the peripheral seal is gas-impervious or non-gas permeable and the provision of air holes or gaps in the peripheral seal is required to allow the release of air from the cavity. However other types of peripherally sealing material may be employed, for example gas-pervious or gas-permeable tape, which is known in the art, in which air, but not the liquid bonding material, is able to pass therethrough. With such a peripheral seal the air holes or gaps in the seal can be dispensed with. The perimeter seal can also be achieved using, polyisobutylene (cored or uncored), butyl tape or silicone which can also be used on the external perimeter edges of the glass, numerous mastics and tapes metalizing the edges, for example with metal arc spray or similar, in fact any perimeter binder which will contain the interlayer liquid or otherwise.

The fire resistant pane and coating of the invention can be prepared utilizing a composition which comprises;
a) about 10 to 40% by weight of Tris (hydroxymethyl) aminomethane and/or at least one member of the group consisting of aliphatic polyols and alicyclic polyols and triethanolamine;
b) about 10 to 30% by weight of a member selected from the group consisting of ammonium phosphate, phosphoric acid, ammonium dibasic phosphate, ammonium dihydrogen phosphate, phosphoric acid and triammonium phosphate;
c) about 35 to 65% by weight of a member selected from the group consisting of alkali metal borates, ammonium borate and its hydrate, sodium teraborate decahydrate, sodium borate, potassium borate; lithium borate; sodium meta borate tetrahydrate, boric acid, boric anhydride, boric oxides and ammonium borate;
d) about 0 to 25% by weight of a member selected from the group consisting of sodium phosphate, potassium phosphate and their hydrates, trisodium phosphate, disodium phosphate, sodium dihydrogen phosphate, sodium monobasic phosphate, potassium dihydrogen phosphate, and lithium dihydrogen phosphate, sodium dibasic phosphate and potassium dibasic phosphate, and
e) about 10 to 35% by weight water.

A preferred fire resistant coating composition of the invention comprises;
a) about 10 to 25% by weight of Tris (hydroxymethyl) aminomethane;
b) about 10 to 25% by weight of ammonium dibasic phosphate;
c) about 30 to 40% by weight of sodium borate decahydrate, and
d) about 10 to 30% by weight water.

A similar composition can be used to form the fire resistant pane of the invention.

The plastic layers which are used can be single layers or laminates which are high impact resistant. Such plastics include polycarbonates, Kynar® polyurethanes, acrylics, ionomers, polyvinyl chloride, Tedlar®, and polyvinyl butyral and the like.

The ionomers which can be used in the invention include SURLYN® from Dupont, NOVIFLEX® and IONOPLAST® from AGP Plastics.

The thickness of the windows will depend on their utility and the type of plastic utilized. A typical window comprises about 3 mm glass/about 1.52 mm FR pane/about 1 mm air gap/3 mm glass for a panel 1.25 m×1.55 m.

The interlayers can comprise about 4-6 mm of glass or plastic.

The plastic sheets or films may further comprise additives, such as thermal stabilizers, ultraviolet (UV) absorbers, UV stabilizers, plasticizers, organic peroxides, adhesion promoters and mixtures or combinations thereof.

The plastic interlayer has a thickness of about 10 mils (0.25 mm), or greater. The ionomer interlayer may have a thickness of about 15 mils (0.38 mm), or greater, based on enhanced penetration strength of the laminates produced therefrom. More preferably, the interlayer may have a thickness of about 50 mils (1.25 mm), or greater, based on even further enhanced penetration strength of the laminates produced therefrom. The enhanced penetration strength is necessary to satisfy many of the current mandated requirements for hurricane and threat resistance. Many end-uses in the current environment require the interlayers to be thicker than 60 mils (1.50 mm), 90 mils (2.25 mm), and even thicker than 120 mils (3.00 mm).

Suitable plastic sheets may be formed by any suitable process, such as extrusion, calendering, solution casting or injection molding. The plastic sheet can be formed by extrusion.

Preferably, one or both surfaces of the plastic film may be treated to enhance the adhesion to the coating or to the polymeric sheet or both. This treatment may take any form known within the art, including adhesives, primers, such as silanes, flame treatments, plasma treatments, electron beam treatments, oxidation treatments, corona discharge treatments, chemical treatments, chronic acid treatments and hot air treatments.

The difference between a polymeric film and a polymeric sheet is the thickness, but there is no set industry standard as to when a film is considered a sheet. A film has a thickness of about 10 mils (0.25 mm) or less, between about 0.5 mils (0.012 millimeters (mm)), to about 10 mils (0.25 mm), or about 1 mil (0.025 mm) to about 5 mils (0.13 mm).

Adhesives and primers may be used to enhance the bond strength between the laminate layers, if desired, as is generally known in the art. For example, silane coupling agents may be applied to the glass or to the films and sheets to enhance the adhesion between layers. Specific examples of useful silane coupling agents are gamma glycidoxylpropyltrimethoxy silane or gamma-aminopropyltriethoxy silane which are considered preferred primers. Typically, said silane coupling agents are added at a level of about 0.01 to about 5 weight percent based on the total weight of the film or sheet composition or applied to the glass surface. Examples of adhesives are epoxy and siloxane resins. Other additives, including but not limited to antioxidants, ultraviolet absorbers, ultraviolet stabilizers, thermal stabilizers, and colorants, may also be added to ionomeric composition. See, e.g. U.S. Pat. No. 5,190,826.

The plastic sheets may further comprise additives such as plasticizers, processing aides, flow enhancing additives, lubricants, pigments, dyes, flame retardants, impact modifiers, neucleating agents to increase crystallinity, antiblocking agents such as silica, thermal stabilizers such as, but not limited to those disclosed in U.S. Pat. Nos. 4,325,863; 4,338,244; 5,175,312; 5,216,052; 5,252,643; 5,356,966; 5,367,008; 5,369,159; 5,428,162; 5,428,177; 5,488,117; 5,516,920; 5,607,624; 5,614,572; 5,693,829; 5,773,631; 5,814,692; 6,140,397; 6,521,681; and 6,586,606. See also, DE-A-4316611; DE-A-4316622; DE-A-4316876; EP-A-0589839; and EP-A-0591102, UV absorbers, UV stabilizers, dispersants, surfactants, chelating agents, coupling agents, adhesives, primers and the like.

The term "glass" is meant to include not only window glass, plate glass, silicate glass, aluminosilicate glasses, sheet glass, tempered glass, chemically treated glass and float glass, but also includes colored glass, specialty glass which includes ingredients to control, for example, solar heating, coated glass with, for example, sputtered metals, such as silver or indium tin oxide, for solar control purposes and other specialty glasses. The type of glass to be selected for a particular laminate depends on the intended use.

The laminated architectural structures which are included in the invention are walls, floors, stairs, doors, bridges, and security windows for automobiles, bank tellers, ships, ocean platforms, locomotives, and the like.

In order to more fully and clearly illustrate the present invention, the following specific examples are presented. It is intended that the examples be considered as illustrative rather than limiting the invention disclosed and claimed herein. In the examples all parts and percentages are on a weight basis unless otherwise specified.

EXAMPLE 1

Preparation of FR Pane

To 25 g of DI water at 50° C. is added with stirring 40 g of Tris (hydroxymethyl) aminomethane, 40 g of ammonium dibasic phosphate, 75 g of sodium borate decahydrate.

The mixture was heated up to 115-120° C. to boil off water. The resultant clear viscous liquid was poured out and pressed flat. The FR pane which was formed was optically clear and withstood 900° C. flame for 30 minutes.

When placed in a window assembly of a thickness of 1-5 inches, a 900° C. flame is directed on the surface of the assembly and the back tempered glass pane remains cool to hand touch up to 50 minutes into test and never exceeds 200° C.

EXAMPLE 2

Preparation of Laminate

A twelve inch square of 0.75 mm thickness of cross-linked partially sodium neutralized ethylene-acrylic acid ionomer sheet having a melt index of 1.5 was adhered to a similar pane of Example 1 and stacked between a pair of 1.5 millimeter of chemically strengthened glass plates. The assembly was placed in a so called "polymer" bag of the type disclosed in U.S. Pat. No. 3,311,517 to Keslar et al. The bag comprises an outer ply of polyethylene terephthalate and an inner ply of polyethylene bonded thereto. The bag was inserted into a second bag of the same material, evacuated and sealed. The sealed unit was placed in an autoclave at 255° F. for three minutes under 150-200 psi pressure in a vacuum. The unit was then cooled to room temperature and the pressure reduced. The assembly was removed from the autoclave and the bags and plastic wrapping were removed from the assembly.

The resulting glazing unit was then ready to insert into a suitable support or frame of a window or door and secured therein.

If desired, metal attachment means can be provided between the outer glass and the ionomer layer so as to imbed them into the plastic layer for anchoring before autoclaving.

What is claimed is:

1. A glazing structure comprising one or more impact and fire resistant window layers comprising;
    A) a first glass or plastic layer;
    B) a fire resistant layer of a composition which essentially comprises about 10-40% by weight of tris (hydroxymethyl)aminoethane aminomethane, about 10 to 30% by weight of a member selected from the group consisting of ammonium phosphate, phosphoric acid, ammonium dibasic phosphate, ammonium dihydrogen phosphate, and triammonium phosphate;
    and about 35 to 65% by weight of a member selected from the group consisting of alkali metal borates, ammonium borate and its hydrate, sodium teraborate decahydrate, sodium borate, potassium borate, lithium borate, sodium meta borate tetrahydrate, boric acid, boric anhydride, boric oxides and ammonium borate, adjacent said first glass or plastic layer, and
    C) a second glass or plastic layer adjacent said fire resistant layer.

2. The glazing structure of claim 1 wherein said first layer is a plastic layer and is selected from the group consisting of polyvinyl butyral and ionomers.

3. The glazing structure of claim 2 wherein said second layer adjacent the fire resistant layer is a glass layer.

4. The glazing structure of claim 1 wherein said fire resistant layer comprises tris (hydroxymethyl)aminomethane, ammonium dibasic phosphate, and sodium borate decahydrate.

5. The glazing structure of claim 4 wherein said fire resistant layer is a pane.

6. The glazing structure of claim 1 wherein said structure is a laminated structure.

7. The glazing structure of claim 6 wherein the structure is a façade.

8. The glazing structure of claim 1 in combination with a door frame having a fire resistant coating comprising the composition of claim 1.

9. A fire resistant wall comprising at least one glazing structure of claim 1.

10. A fire and impact resistant window consisting essentially of;
 a) a first glass or plastic layer;
 b) a first fire resistant layer of a composition which essentially comprises 10-40% by weight of tris (hydroxymethyl)aminomethane, about 10 to 30% by weight of a member selected from the group consisting of ammonium phosphate, phosphoric acid, ammonium dibasic phosphate, ammonium dihydrogen phosphate, phosphoric acid and triammonium phosphate;
 and about 35 to 65% by weight of a member selected from the group consisting of alkali metal borates, ammonium borate and its hydrate, sodium teraborate decahydrate, sodium borate, potassium borate, lithium borate, sodium meta borate tetrahydrate, boric acid, boric anhydride, boric oxides and ammonium borate;
 c) a second glass or plastic layer;
 d) a second fire resistant layer, and
 e) a third glass or plastic layer.

11. An architectural structure comprising at least one glazing structure of claim 1.

12. The architectural structure of claim 11 wherein the structure is a stair.

* * * * *